(12) United States Patent
Wang

(10) Patent No.: US 11,353,470 B2
(45) Date of Patent: Jun. 7, 2022

(54) SPECTRAL-POTENTIOMETRIC-THERMOMETRIC MULTI-DIMENSIONAL TITRATION ANALYSIS INSTRUMENT AND USE METHOD THEREOF

(71) Applicants: Fei Wang, Qinhuangdao (CN); Qinhuangdao Water Bear Technology Co., Ltd., Qinhuangdao (CN)

(72) Inventor: Fei Wang, Qinhuangdao (CN)

(*) Notice: Subject to any disclaimer, the term of this patent is extended or adjusted under 35 U.S.C. 154(b) by 393 days.

(21) Appl. No.: 16/726,150

(22) Filed: Dec. 23, 2019

(65) Prior Publication Data

US 2020/0132704 A1 Apr. 30, 2020

Related U.S. Application Data

(63) Continuation of application No. PCT/CN2019/097096, filed on Jul. 22, 2019.

(30) Foreign Application Priority Data

Jul. 15, 2019 (CN) .......................... 201910636634.9

(51) Int. Cl.
*G01N 35/00* (2006.01)
*G01N 31/16* (2006.01)

(52) U.S. Cl.
CPC ....... *G01N 35/00584* (2013.01); *G01N 31/16* (2013.01); *G01N 2035/00346* (2013.01); *G01N 2035/00534* (2013.01); *G01N 2035/00564* (2013.01)

(58) Field of Classification Search
CPC ............ G01N 35/00584; G01N 31/16; G01N 2035/00346; G01N 2035/00534; G01N 2035/00564; G01N 31/164
See application file for complete search history.

(56) References Cited

FOREIGN PATENT DOCUMENTS

CN 107703202 A * 2/2018 ............ G01N 21/79

* cited by examiner

*Primary Examiner* — Jennifer Wecker
*Assistant Examiner* — Oyeleye Alexander Alabi

(57) ABSTRACT

The present invention discloses a spectral-potentiometric-thermometric multi-dimensional titration analysis instrument, which comprises a spectral titration measurement device, a thermometric titration measurement device and a potentiometric titration measurement device which are arranged in parallel, meets the simultaneous measurement requirements of different analysis methods in chemical analysis, improves the measurement precision of different measurement methods, and effectively reduces the workload of separate experiments. The present invention further provides a usage method of the analysis instrument, provides analysis results of different angles and different characterization parameters for the change process of the material structure in the chemical reaction by conducting comparison analysis on data obtained using different measurement techniques, and effectively reduces the workload of titration analysis.

10 Claims, 10 Drawing Sheets

SPECTRAL-POTENTIOMETRIC-THERMOMETRIC MULTI-DIMENSIONAL TITRATION ANALYSIS INSTRUMENT AND USE METHOD THEREOF

TECHNICAL FIELD

The present invention belongs to the technical field of measurement, particularly relates to the technical field of analytical chemistry, and more particularly relates to a spectral-potentiometric-thermometric multi-dimensional titration analysis instrument and titration method thereof.

BACKGROUND

In titration chemical analysis, the change and metering of the material structure in the reaction solution are extremely important basis in chemical analysis. It is an important part widely used in chemical analysis that different measurement methods are used for same measurement objects to obtain different measurement data, and the data are compared to provide analysis data of different physical quantities for the change process of the material structure in the chemical reaction.

Potentiometric titration is to insert a measurement electrode into the solution to be measured, form a galvanic cell with the material to be measured, characterize the change of the material structure in the reaction solution by measuring the change of potential, and identify the progress of the chemical reaction, and has the disadvantages of electrode passivation and diaphragm blockage. As an analysis measurement method, the thermometric titration technique uses a temperature sensor to sense the temperature change in the titration solution system, wherein a thermistor is usually used as a sensing element of the temperature sensor, when the temperature of the reaction system changes slightly, the resistance value changes, has the characteristics of no need of contacting solution when measuring resistance, one electrode suitable for various types of titration, fast measurement, high resolution, simple operation, accurate result and convenient maintenance of temperature sensing system, and has the disadvantage of being not suitable for complex system measurement. Spectral titration is a non-destructive measurement method for analyzing the progress of reaction by analyzing the change of visible light signals passing through the solution, has the advantages of fast response speed, wide measurement range, simple operation and accurate structure, and has the disadvantages of only characterizing the structure change of coloring material and identifying coloring chemical reaction.

At present, the titration analysis techniques at home and abroad are to form a set of instrument separately by means of the thermometric titration method, spectral titration method and electrochemical titration method, and cannot provide synchronous measurement results for the same chemical reaction process, and cannot conduct comparison on synchronous data of different measurement results. However, such data comparison based on same measurement conditions is important for the characterization analysis of material structures. Each of the three methods has advantages and disadvantages, and it is an improvement in the analysis industry to integrate the three methods into a unified measurement technique. Previously, due to technical reasons, no instrument has the ability to simultaneously measure thermometric, visible-light spectral and electrochemical titration data and can meet the requirements of obtaining simultaneous measurement data of different methods in chemical analysis, so that only separate experiments can be used to determine parameters separately, having the defects as follows: 1) due to non-uniform objects under measurement, the matrix and measurement conditions of multiple experiments are different in separate experiments, and then the data of multiple chemical reactions are different, so that the obtained chemical reaction data may have errors when performing comparison analysis based on different experimental data; 2) fewer samples cannot meet the requirements of samples of multiple separate experiments, and multiple separate experiments also add the experimental steps, prolong the experimental time and affect the experimental process.

Therefore, the problem to be urgently solved by those skilled in the art is how to develop a spectral-potentiometric-thermometric multi-dimensional titration analysis instrument capable of providing synchronous measurement results of multiple titration modes for the same chemical reaction process and a usage method thereof.

SUMMARY

In view of this, with respect to problems existing in the prior art, an object of the present invention is to provide a spectral-potentiometric-thermometric multi-dimensional titration analysis instrument capable of providing synchronous measurement results for the same chemical reaction process, which can meet the simultaneous measurement requirements of different analysis methods in chemical analysis, improve the measurement precision of different measurement methods, effectively reduce the workload of multiple separate experiments, and achieve synchronous measurement for the same analysis object and different analysis methods.

To achieve the above object, the present invention adopts the following technical solution:

A spectral-potentiometric-thermometric multi-dimensional titration analysis instrument, comprising a reagent control system, a titration measurement system and a data processing system, the reagent control system being connected with the data processing system by the titration measurement system, wherein the reagent control system comprises a reagent compartment and a measurement compartment, the reagent compartment being in communication with the measurement compartment by a reagent pipeline;

the titration measurement system comprises a spectral titration measurement device, a thermometric titration measurement device and a potentiometric titration measurement device, the spectral titration measurement device, the thermometric titration measurement device and the potentiometric titration measurement device being arranged in parallel inside the measurement compartment; and the data processing system comprises a measurement signal conversion and calculation device, the measurement signal conversion and calculation device being connected with the spectral titration measurement device, the thermometric titration measurement device and the potentiometric titration measurement device respectively by signals.

It is worth noting that at least one of the measurement compartments is in communication with at least one of the reagent compartments, illustratively, in some cases, one of the measurement compartments is in communication with a plurality of reagent compartments; and in other cases, the plurality of measurement compartments are in communication with one of the reagent compartments.

In titration chemical analysis, the change and metering of the material structure in the reaction solution are basis in chemical analysis, while spectral titration, thermometric titration and potentiometric titration provide structural characteristic information for the chemical reaction and change of material structure therein using different physical quantities.

Considering that the change of the material structure in the chemical reaction is often shown as the color change of the reaction solution, in the process of spectral titration, with the continuous addition of titrant and the progress of reaction, the material structure in the chemical reaction changes continuously. Different structures have different absorption capacities for different wavelengths of visible-light spectra, resulting in corresponding changes in the color of the reaction solution. At this time, the change conditions are identified by different parameters and derived parameters, and the chemical reaction and change of material structure therein and change process may be identified and/or characterized by titration curves.

The potentiometric titration method is to characterize the chemical reaction according to the change of the electrochemical potential of different structures of material in the reaction solution. In the process of potentiometric titration, with the continuous addition of titrant, the structure of material participating in the chemical reaction changes in the reaction process, and the electrode potential Es of the structure changes continuously, when the electrode potential undergoes a predetermined jump, the titration end-point is reached. At this time, different parameters and derived parameters are used to identify change conditions and/or characterize the chemical reaction and change of material structure therein and change process.

Meanwhile, considering that some chemical reactions may be accompanied by heat absorption and heat release, this change in temperature is called enthalpy change ($\Delta H$), the principle formula thereof is $\Delta H = \Delta G + T\Delta S$, where $\Delta G$ represents the variation of free energy, T represents the temperature of reaction system, and $\Delta S$ represents the variation of enthalpy. Therefore, as the thermometric titration reaction occurs, heat is released into the environment or absorbed from the environment, thus the temperature of the solution rises or falls. At this time, the temperature can be used as a measurement parameter to identify and/or characterize the chemical reaction and change of material structure therein and change process.

Therefore, when using the spectral titration technique, the potentiometric titration technique and the thermometric titration technique to simultaneously measure the same reaction process in the same measurement environment and state, the potentiometric titration technique and the thermometric titration technique, as mature chemical analysis and measurement techniques, may not reduce the precision and accuracy of measurement made by separate instruments theoretically; and the spectral titration technique, as a new invention technique of the inventor, is applied to verify the aforementioned mature techniques, and is newly applied in the aspects of data noise, data correction, measurement curve processing, and the like.

It is worth noting that the present invention integrates the three techniques into the same instrument, and has the advantage that instrument costs can be obviously reduced since the reagent system and data processing device are shared structurally as compared with a separate instrument of the existing single technique; by comparing data from three measurement methods simultaneously, multi-dimensional measurement data without relative error for same measurement objects can be obtained, by conducting comparison analysis on data from different measurement techniques, analysis results of different angles and different characterization parameters can be provided for the change process of the material structure in the chemical reaction, improving the precision of different measurement methods and the accuracy of the analysis method, effectively reducing the workload of titration analysis and obtaining more accurate measurement method and finding new material physical properties and structure data. The present invention provides a novel analytical technology platform for analytical chemistry by adopting the multi-dimensional synchronous analytical technology of the same reaction process.

Preferably, the reagent compartment comprises a titration solution storage container, a reagent control device and a first temperature control device, wherein the titration solution storage container is in communication with the reagent control device by a reagent pipeline, and the first temperature control device is connected with the titration solution storage container;

the reagent control device comprises a protective gas assembly, a gas filtration assembly and a liquid sensing assembly, wherein the protective gas assembly is configured to provide a protective gas environment for a titration reagent in the titration solution storage container, the gas filtration assembly is configured to filter air gas, and the liquid sensing assembly is configured to sense the remaining amount of the titration solution in the titration solution storage container; and the first temperature control device comprises a heating assembly, a cooling assembly and a temperature sensing assembly, and the first temperature control device provides a constant-temperature environment for the titration reagent.

It is worth noting that the protective gas assembly comprises protective gas pipeline(s) and valve(s), the at least one protective gas pipeline comprising at least one protective gas inlet and at least one valve.

It is worth noting that the gas filtration assembly comprises a purifying agent container, an air pipeline, a purified gas pipeline and a plurality of valves, wherein air enters the purifying agent container through the air pipeline, the purifying agent removes interfering material, such as carbon dioxide, oxygen or water from the air according to the needs of titration, and the filtered clean air enters the titration solution storage container through the purified gas pipeline; and both the air pipeline and the purified gas pipeline are provided with valves to control the opening, closing and airflow velocity of the pipelines.

It is worth noting that the liquid sensing assembly comprises a magnetic sensor and a non-contact sensor, wherein the magnetic sensor is arranged on the outer wall of the titration solution storage container to sense the liquid level of the titration solution in the titration solution storage container; and the non-contact sensor is arranged at the bottleneck of the titration solution storage container to sense the volume of the solution in the titration solution storage container.

In the prior art, the storage temperature of the titration reagent is substantially synchronized with the environment temperature. For some unstable, temperature-sensitive reagents, when the environment temperature changes, there may be changes such as crystallization, precipitation, gas generation and volatilization, causing the concentration and stability of the reagent solution to change, thus affecting the measurement results. In the present invention, by arranging the first temperature control device in the reagent compartment, the influence of the environment temperature on the storage reagent is reduced, the storage reagent is stored at required high temperature or low temperature constantly according to the settings, and the titration solution is heated or cooled in advance based on the needs of titration measurement, which is beneficial to chemical titration.

Moreover, taking into account that the interference in the air is unknown, for example, carbon dioxide, oxygen and the like are easy to chemically react with the titration reagent, which may cause a change in property of the titration reagent, the present invention provides a protective environment of filtered clean air and inert gas for the titration reagent by arranging the protective gas assembly and gas filtration assembly, thereby avoiding the influence of the reactive gas in the air on the titration reagent.

It is further worth noting that each of the titration solution storage container and the purifying agent container has a sealed container opening to avoid material exchange between the titration solution or the purifying agent and the outside, to ensure the stability of the storage environment of the titration solution and the purifying agent.

Preferably, the measurement compartment comprises a manipulator, a titration head, a titration control device, a reaction container, a stirring device, a cleaning device, a second temperature control device, a gas protection device and a feedback signal device, wherein the titration head is connected with the measurement compartment wall by the manipulator, to achieve the relative displacement of the titration head and the reaction container;

the titration control device, the stirring device, the cleaning device and the gas protection device are connected with the titration head respectively, and achieve relative displacement to the reaction container through the titration head;

the feedback signal device is connected with the manipulator, the titration control device, the stirring device, the cleaning device, the second temperature control device and the gas protection device respectively by signals, the second temperature control device is configured to control the container temperature of titration reaction, and the gas protection device is configured to provide a protective gas environment for titration reaction; and the titration control device is in communication with the reagent control device by a pipeline, and the feedback signal device is connected with the measurement signal conversion and calculation device by signals.

It is worth noting that the side wall of the reaction container is provided with a solution overflow hole to guarantee that the reaction solution in the reaction container may not overflow from the top edge of the reaction container, and the outside of the reaction container is also provided with a waste solution collection tray to collect solution overflowing from the solution overflow hole, the waste solution collection tray comprising a waste solution outlet, the overflowing solution being discharged from the measurement compartment through the waste solution outlet.

It is worth noting that the cleaning device comprises a cleaning fluid assembly and a cleaning gas assembly, wherein the cleaning fluid assembly flushes the stirring device, the optical signal sensor, the temperature signal sensor and the potential signal sensor which are immersed in the reaction solution by spraying cleaning fluid, and the cleaning gas assembly purges the stirring device, the optical signal sensor, the temperature signal sensor and the potential signal sensor which are immersed in the reaction solution through clean air or inert gas.

It is worth noting that the titration control device comprises at least one reagent adding assembly and a liquid level distance sensor, wherein the speed, type or time of addition of the titration reagent is controlled by the opening or closing of the reagent adding assembly, and the distance between the titration head and the reaction container is controlled by the liquid level distance sensor.

Because of considering semi-automatization and batch use of multi-dimensional titration instruments, by integrating the manipulator with the titration head, the present invention achieves the relative displacement of the titration control device, the stirring device, the cleaning device and the gas protection device to the reaction container, thereby avoiding frequent manual operations conducted on the existing instrument while in use, then increasing the analysis speed and reducing the workload of analysts.

To control the titration reaction condition, in the present invention, the speed, type or time of addition of the titration reagent is adjusted by the titration control device of the measurement compartment; the uniformity of the reaction solution system is guaranteed by arranging the stirring device, thereby achieving accuracy of titration measurement; moreover, considering the automation of multi-dimensional titration instruments and the continuity of titration measurement, in the present invention, by connecting the cleaning device with the reaction container and the stirring device by a pipeline, cross-contamination of the reaction solution during multiple continuous measurement is avoided, creating measurement quality assurance conditions for continuous measurement.

Moreover, considering that during some titration reaction measurement, both the reaction temperature and reaction atmosphere have an important influence on the measurement result of the titration reaction, for example, the experiment to measure reducing sugar in food requires titration of the sample in a boiling state, the normal temperature reaction environment cannot meet the measurement condition requirements at this time; and for another example, in the process of measuring the peroxide value of grease, oxygen in the air can oxidize grease, affecting the measurement result of the peroxide value, at this time, the presence of inert atmosphere has an important influence on the accuracy of the reaction measurement result. Therefore, in the present invention, by arranging the second temperature control device and the gas protection device, it is guaranteed that the titration reaction environment can be adjusted according to different titration reactions, thus guaranteeing the wide applicability of multi-dimensional titration instruments and the accuracy of reaction measurement results.

More preferably, the thermometric titration measurement device comprises a temperature signal sensor, the potentiometric titration measurement device comprises a potential signal sensor, and the spectral titration measurement device comprises an optical signal sensor, wherein the temperature signal sensor, the potential signal sensor and the optical signal sensor are connected with the reaction container by signals;

the temperature signal sensor and the potential signal sensor are connected with the titration head, and achieve relative displacement to the reaction container through the titration head; and the spectral titration measurement device further comprises a light source and an optical signal loading component, the light source, the optical signal loading component and the optical signal sensor being connected in sequence by optical signals.

It is worth noting that the light source is an uninterrupted continuous light source with an emission wavelength of 380 nm to 780 nm, and one, several or all wavelengths of optical signals emitted by the light source are emitted to the chemical reaction solution through the optical signal loading component, and then are absorbed and/reflected by the chemical reaction solution, to provide spectral measurement information for the measurement signal conversion and calculation device by the optical signal sensor.

In the process of multi-dimensional titration measurement, the temperature signal sensor, the potential signal sensor and the optical signal sensor can separately or synchronously detect the titration reaction in the reaction container. After the measurement periods of the three are synchronously set, measurement data of each metering point can be regarded as the measurement data of the same reaction system at the same moment in different measurement modes. At this time, by conducting comparison analysis on the measurement data of different metering points in the same measurement mode or the measurement data of the same metering point in different measurement modes, material structure characterization information of different physical and chemical parameters based on the same measurement condition can be obtained, thereby realizing the change characterization and metering analysis of the material structure in the reaction solution.

Further preferably, the optical signal loading component comprises an optical lens, the optical lens being arranged on the outer wall of the reaction container.

It is worth noting that the optical lens may be one or more in number, in one case, the one optical lens is arranged on the outer wall at one side of the reaction container; and in another case, the two optical lenses are arranged in parallel on the outer wall of the reaction container, the first optical lens is arranged on the outer wall at one side of the reaction container, the second optical lens is arranged on the outer wall at the opposite side of the reaction container, and the light source, the first optical lens and the second optical lens are located sequentially in a straight line.

Further preferably, the optical signal loading component further comprises a reflector, the reflector being arranged on the outer wall or inside of the reaction container.

Illustratively, in some application scenarios, the reflector is located the inside of the reaction container, the measurement light emitted by the light source is emitted to the reaction solution by the optical lens on the outer wall of the reaction container, is reflected by the reflector in the reaction solution and then is emitted to the optical signal sensor by the optical lens, and the light source, the optical lens and the reflector are located sequentially in a straight line; and illustratively, in another some application scenarios, the reflector is located on the outer wall of the reaction container, the measurement light emitted by the light source is emitted to the reaction solution by the first optical lens on the outer wall of the reaction container, is emitted to the reflector located on the outer wall of the reaction container by the second optical lens located on the outer wall at the other side of the reaction container, is reflected, and then is emitted to the optical signal sensor by the first optical lens through the reaction solution, and the light source, the first optical lens, the second optical lens and the reflector are located sequentially in a straight line.

Preferably, the spectral-potentiometric-thermometric multi-dimensional titration analysis instrument for chemical reaction further comprises a data output display system, the data output display system being connected with the data processing system to synchronously output and display multi-dimensional titration parameters.

Another object of the present invention is to provide a usage method of the spectral-potentiometric-thermometric multi-dimensional titration analysis instrument.

To achieve the above object, the present invention provides the following technical solution:

A titration method of the spectral-potentiometric-thermometric multi-dimensional titration analysis instrument, comprising the following steps:

S1. starting the instrument;

S2. setting environment parameters of the reagent compartment, controlling the temperature of the reagent compartment by the first temperature control device, filtering the air gas by the gas filtration assembly of the reagent control device, and providing a protective gas environment for the titration reagent by the protective gas assembly of the reagent control device;

S3. setting environment parameters of the measurement compartment, setting a titration parameter of the titration reagent by the titration control device, controlling the temperature of the measurement compartment by the second temperature control device, and filling protective gas for the reaction container by the gas protection device;

S4. preprocessing before measurement: conducting reference calibration on the instrument, and preparing titrate in the reaction container for later use;

S5. setting measurement parameters: setting at least one metering parameter in the data processing system, selecting one or more of a spectral titration mode, a thermometric titration mode and a potentiometric titration mode, and selecting at least one measurement parameter of the titration modes;

S6. measuring reaction to be measured: adding the titration reagent in the titration solution storage container into the reaction container by the reagent control device and the titration control device, reacting with the titrate obtained in step S4, and synchronously measuring the reaction solution in the reaction container by one or more of the spectral titration measurement device, the thermometric titration measurement device and the potentiometric titration measurement device, to obtain measurement data corresponding to the metering parameter set tin step S5 and the measurement parameter;

S7. storing and analyzing the measurement data obtained in step S6 by the data processing system, and synchronously displaying the measurement data by the data output display system; and S8. after titration is completed, terminating the operation of the titration control device, the gas protection device, the stirring device and the second temperature control device by the feedback signal device, and starting the cleaning device to clean the stirring device, the optical signal sensor, the temperature signal sensor and the potential signal sensor which are immersed in the reaction solution.

It is worth noting that the titration parameter of the titration reagent described in step S3 includes one or more of titration rate, titration time, and titration type of the titration reagent.

It is worth noting that the metering parameter described in step S5 includes one or more of time t and derived parameter thereof, pulse signal f and derived parameter thereof, pH value of the reaction solution and derived parameter thereof, added reagent volume V and derived parameter thereof, reaction solution concentration C and derived parameter thereof, potentiometric titration parameter Es and derived parameter thereof, thermometric titration parameter T and derived parameter thereof, and spectral titration parameter S and derived parameter thereof. It can be understood that the metering parameter is a measurement reference selected for clarifying measurement points and constructing titration curves. In the prior art, time t or added reagent volume V is usually selected as a measurement reference. However, in actual titration analysis, researchers often need to conduct calculation on different characterization parameters such as chemometrics, chemical thermodynamics and reaction kinetics of the same chemical reaction. Thus, the selection of different metering parameters has a very important impact on the information collection and measurement data processing of titration analysis. Therefore, considering the existing titration analysis method and the change and metering of the material structure in the reaction solution, in the present invention, the selection of the metering parameters is specifically limited, but it should be understood that all other metering parameters and derived parameters thereof obtained by those skilled in the art without contributing creative labor are within the scope of protection of the present invention.

Moreover, considering one or more of the spectral titration mode, the thermometric titration mode and the potentiometric titration mode selected in step S5, multi-dimensional titration analysis is conducted, the measurement parameter of the present invention includes one or more of potentiometric titration parameter Es and derived parameter thereof in the potentiometric titration mode, thermometric titration parameter T and derived parameter thereof in the thermometric titration mode, and spectral titration parameter S and derived parameter thereof in the spectral titration mode.

Wherein, the derived parameter is any dependent variable parameter obtained by at least one calculation through the calculation method well known in the art by taking the set at least one metering parameter or at least one measurement parameter as an independent variable. It should be understood that derived parameters of all other metering parameters or measurement parameters obtained by those ordinary skilled in the art without contributing creative labor will belong to the protection scope of the present invention.

Preferably, the measurement mode of the spectral titration mode described in step S5 includes a total transmission mode, a total transmission-total reflection mode, a semi-transmission-semi reflection mode, or a reflective mode.

It is worth noting that the total transmission mode belongs to a non-contact measurement mode, in which the light of the light source enters the reaction container from the side of the reaction container provided with the first optical lens, some wavelength light of the light of the light source are absorbed in the reaction solution, then signal light loaded with absorption signals is reflected out of the reaction container from the opposite side of the reaction container by the second optical lens, and the spectral information is introduced into the measurement signal conversion and calculation device by the optical signal sensor, to obtain the absorption information of the reaction solution;

the total transmission-total reflection mode belongs to a non-contact measurement mode, in which the light of the light source enters the reaction container from the side of the reaction container provided with the first optical lens, some wavelength light of the light of the light source are absorbed in the reaction solution, signal light loaded with absorption signals is reflected out of the reaction solution from the opposite side of the reaction container by the second optical lens, is reflected by the reflector arranged on the outer wall of the reaction container and enters the reaction solution again, is absorbed and loaded with absorption signals again, and is reflected out of the reaction container from the first optical lens, and the spectral information is introduced into the measurement signal conversion and calculation device by the optical signal sensor, to obtain the absorption information of the reaction solution, wherein one measurement process of the full transmission-total reflection mode includes two processes of loading absorption signals to increase the signal strength;

the semi transmission-semi reflection mode belongs to a contact measurement mode, in which the light of the light source enters the reaction container from the optical lens, some wavelength light of the light of the light source are absorbed in the reaction solution, signal light loaded with absorption signals is reflected back to the optical lens by the reflector inside the solution and is reflected out of the reaction container, and the spectral information is introduced into the measurement signal conversion and calculation device by the optical signal sensor, to obtain the absorption information of the reaction solution; and the reflective mode belongs to a non-contact measurement mode, in which the light of the light source enters the reaction container from the optical lens, some wavelength light of the light of the light source are absorbed by the surface of the reaction solution, signal light loaded with absorption signals is reflected out of the reaction container from the surface of the solution, and the spectral information is introduced into the measurement signal conversion and calculation device by the optical signal sensor, to obtain the absorption information of the reaction solution.

Preferably, the measurement mode of the thermometric titration mode described in step S5 includes an immersion contact mode, an adherence contact mode, and a solution surface irradiation mode or container surface irradiation mode.

It is worth noting that the immersion contact mode is that: the sensor is immersed in the reaction solution, and the temperature change of the reaction solution is directly transmitted to the temperature sensor;

the adherence contact mode belongs to a contact measurement mode, in which the temperature sensor is adhered to the outer wall of the reaction container, and the temperature change of the reaction solution is transmitted to the reaction container and then is transmitted to the temperature sensor by the reaction container;

the solution surface irradiation mode belongs to a non-contact measurement mode, in which the infrared energy signals radiated on the surface of the reaction solution are focused on the temperature sensor and converted into corresponding electrical signals; and the container surface irradiation mode belongs to a non-contact measurement mode, in which the heat change of the reaction solution is transmitted to the surface of the reaction container, and the infrared energy signals radiated on the surface of the reaction container are focused on the temperature sensor and converted into corresponding electrical signals.

The operating principle of the present invention is that: in the same measurement process, the spectral titration measurement device, the potentiometric titration measurement device and the temperature measurement device are arranged in parallel, to simultaneously or separately measure measurement parameters, obtain spectral titration parameters, potentiometric titration parameters and temperature measurement parameters under the same chemical reaction condition, and substantially reduce or even eliminate errors between measurement parameters of different measurement modes due to different measurement conditions, reducing the workload of multiple titration of the same sample and having high measurement accuracy; and by arranging the reagent compartment and the measurement compartment, measurement environment conditions are uniformly unified, so that the external interference is small, and the sensitivity and accuracy of the multi-dimensional titration are improved, making the measurement results more accurate and reliable.

Compared with the prior art, the present invention has the advantageous technical effects that:

1. the single titration measurement instrument is changed into a multi-dimensional titration instrument comprising a spectral titration measurement device, a potentiometric titration measurement device and a thermometric titration measurement device which are arranged in parallel, on the basis of not changing the existing operating procedures, errors between the measurement parameters of different measurement modes due to different measurement conditions in the titration measurement process and unknown chemical reaction process can be corrected in real time by unifying the measurement parameters of the metering points, being beneficial to reducing the errors between different titration measurement modes, and improving the measurement precision;

2. by controlling the titration solution storage and titration reaction environments by the reagent compartment and the measurement compartment, the titration environment conditions are unified, the external interference is reduced, and the purposes of improving the signal-to-noise ratio of the titration system and increasing the measurement sensitivity of multi-dimensional titration are achieved;

3. the unit has clear functions and simple structure, facilitates integration and miniaturization, and can realize semi-automatic and batch measurement of titration reactions; and 4. simultaneous measurement of the same samples using multiple titration modes may be achieved, improving the analysis speed, reducing analysis steps, and greatly reducing the workload of analysts.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

DETAILED DESCRIPTION

The technical solution in embodiments of the present invention will be clearly and fully described below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

To better understand the present invention, the present invention is further described in detail below by the following embodiments, but cannot be interpreted as a limitation to the present invention. Non-essential improvements and adjustments made by those skilled in the art according to the contents of the present invention shall also be deemed to fall within the protection scope of the present invention.

Embodiment 1

Referring to FIGS. 1-8, a multi-dimensional titration instrument, comprising a reagent control system, a titration measurement system and a data processing system, the reagent control system being connected with the data processing system by the titration measurement system.

Figure 1:
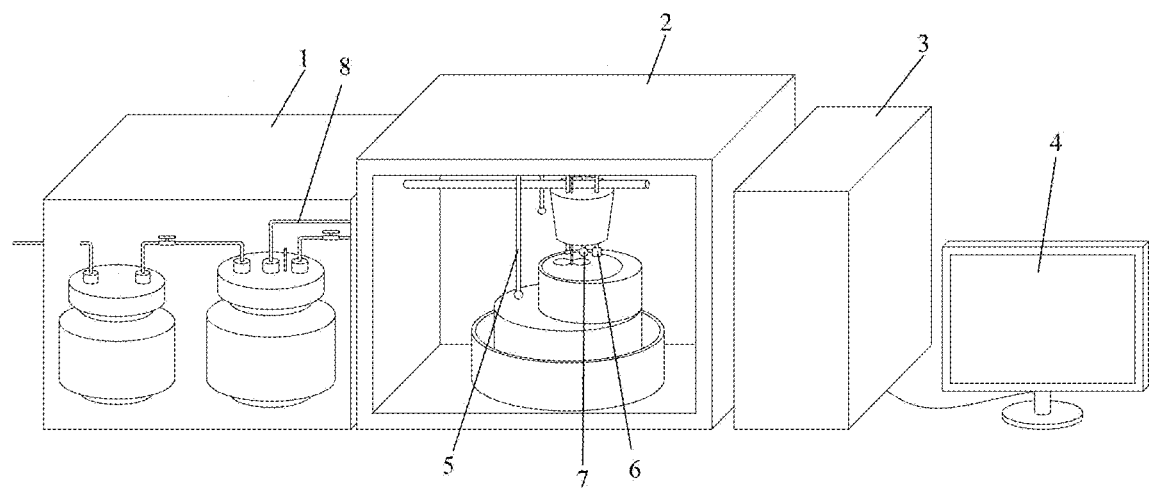
FIG. 1 is a schematic diagram showing a spectroscopic-potentiometric-thermometric multi-dimensional titration analysis instrument provided by the present invention.

Referring to FIG. 1, the reagent control system comprises a reagent compartment 1 and a measurement compartment 2, the reagent compartment 1 being in communication with the measurement compartment 2 by a pipeline 8.

Figure 2:
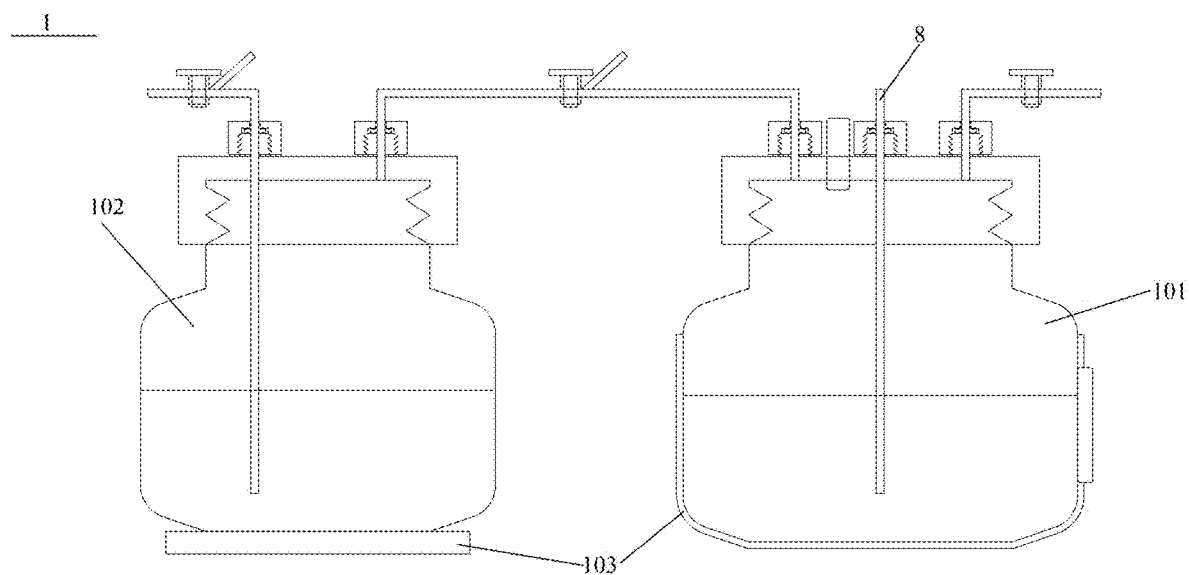
FIG. 2 is a schematic diagram showing a reagent compartment of a spectroscopic-potentiometric-thermometric multi-dimensional titration analysis instrument provided by the present invention.

Referring to FIG. 2, the reagent compartment 1 comprises a titration solution storage container 101, a reagent control device 102 and a first temperature control device 103, wherein the titration solution storage container 101 is in communication with the reagent control device 102 by a reagent pipeline, and the first temperature control device 103 is connected with the titration solution storage container 101.

Figure 3:
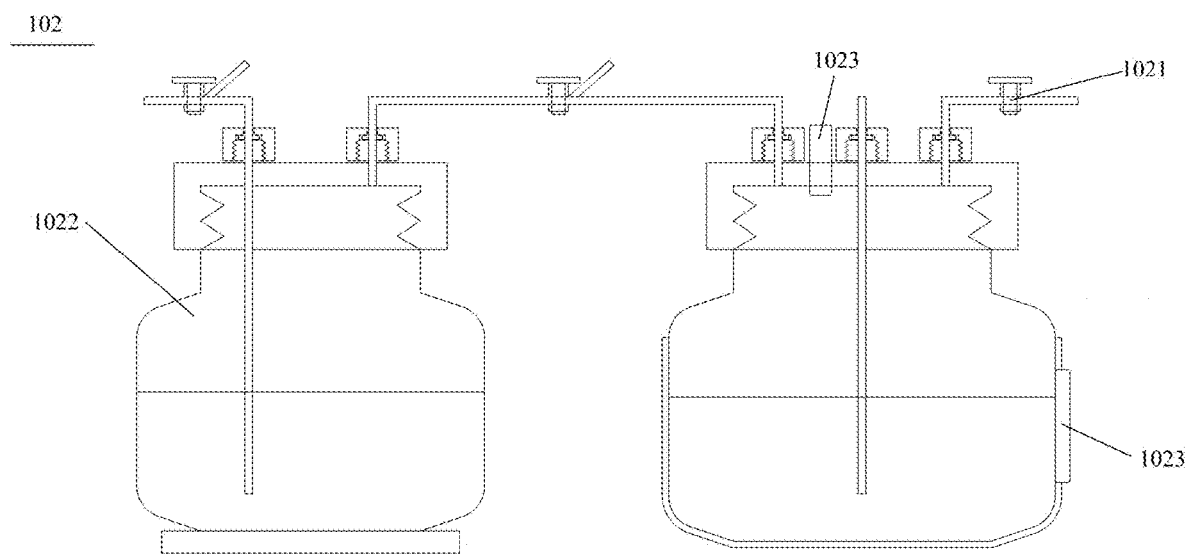
FIG. 3 is a schematic diagram showing a reagent control device of a reagent compartment of a spectroscopic-potentiometric-thermometric multi-dimensional titration analysis instrument provided by the present invention.

Referring to FIG. 3, the reagent control device 102 comprises a protective gas assembly 1021, a, gas filtration assembly 1022 and a liquid sensing assembly 1023, wherein the protective gas assembly 1021 is configured to provide a protective gas environment for a titration reagent in the titration solution storage container 101, the gas filtration assembly 1022 is configured to filter air gas, and the liquid sensing assembly 1023 is configured to sense the remaining amount of the titration solution in the titration solution storage container 101.

Figure 4:
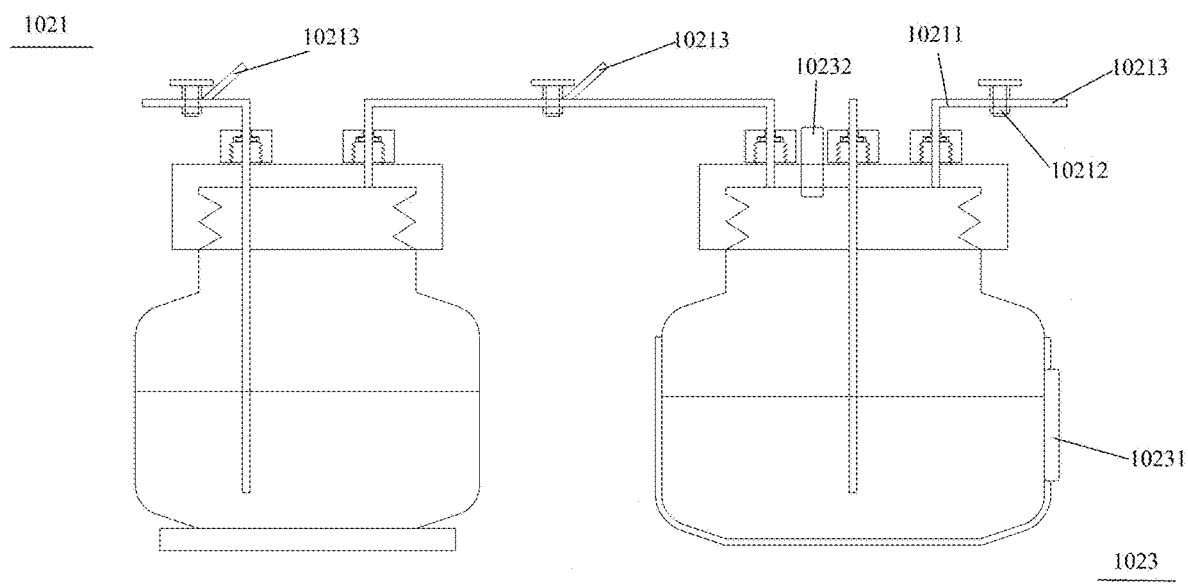
FIG. 4 is a schematic diagram showing a protective gas assembly and a liquid sensing assembly of a reagent control device of a reagent compartment of a spectroscopic-potentiometric-thermometric multi-dimensional titration analysis instrument provided by the present invention.

Referring to FIG. 4, the protective gas assembly 1021 comprises protective gas pipeline(s) 10211 and valve(s) 10212, the at least one protective gas pipeline 10211 comprising at least one protective gas inlet 10213 and at least one valve 10212.

Figure 5:
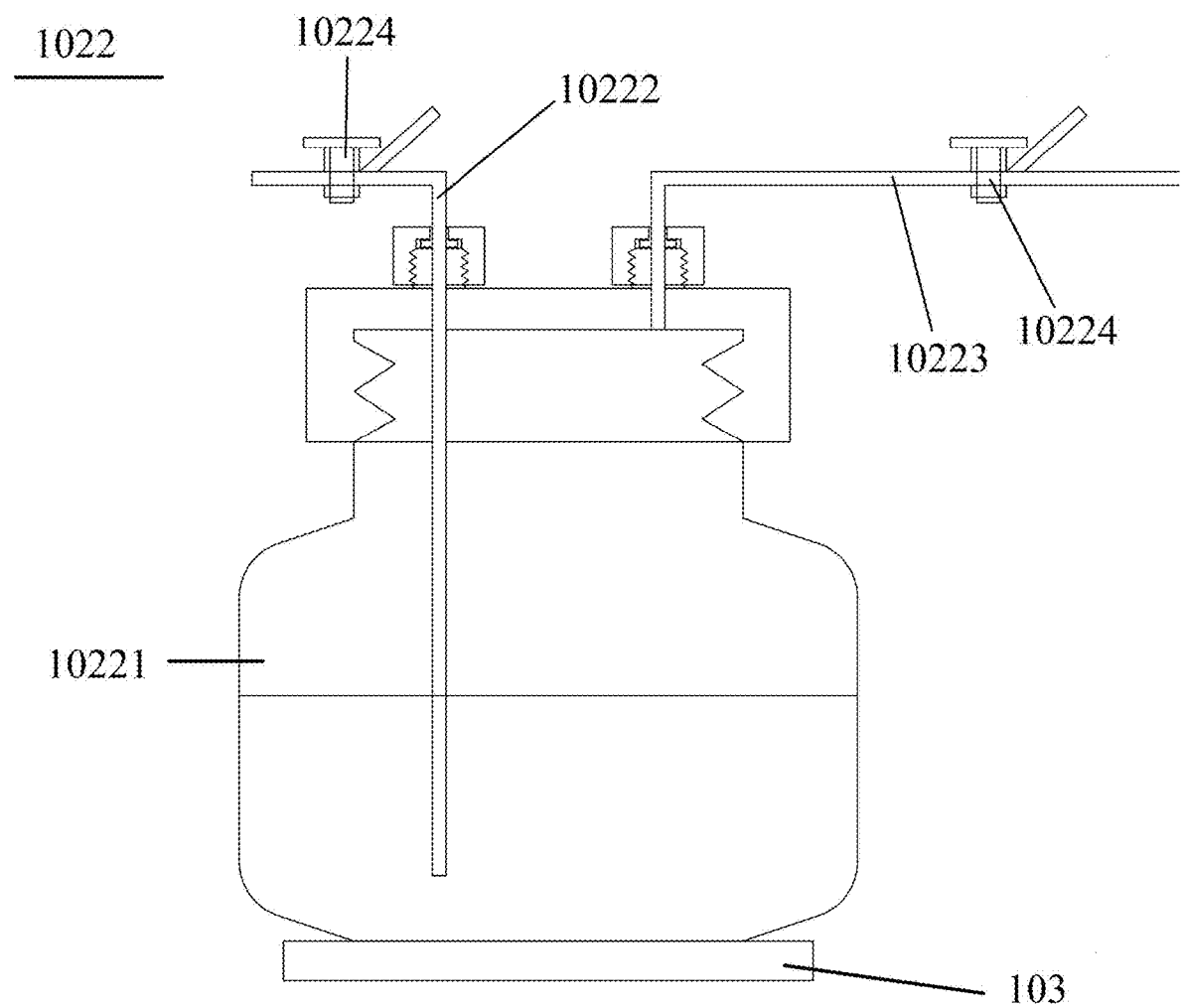
FIG. 5 is a schematic diagram showing a gas filtration assembly of a reagent control device of a reagent compartment of a spectroscopic-potentiometric-thermometric multi-dimensional titration analysis instrument provided by the present invention.

Referring to FIG. 5, the gas filtration assembly 1022 comprises a purifying agent container 10221, an air pipeline 10222, a purified gas pipeline 10223 and a plurality of valves 10224, wherein air enters the purifying agent container 10221 through the air pipeline 10222, purifying agent removes carbon dioxide, oxygen or water from the air according to the needs of titration, and the filtered clean air enters the titration solution storage container 101 through the purified gas pipeline 10223; and both the air pipeline 10222 and the purified gas pipeline 10223 are provided with valves 10224 to control the opening, closing and airflow velocity of the pipelines.

Referring to FIG. 4, the liquid sensing assembly 1023 comprises a magnetic sensor 10231 and a non-contact sensor 10232, wherein the magnetic sensor 10231 is arranged on the outer wall of the titration solution storage container 101 to sense the liquid level of the titration solution in the titration solution storage container 101; and the non-contact sensor 10232 is arranged at the bottleneck of the titration solution storage container 101 to sense the air pressure in the titration solution storage container 101;

the first temperature control device 103 comprises a heating assembly, a cooling assembly and a temperature sensing assembly, and the first temperature control device 103 provides a constant-temperature environment for the titration reagent.

Figure 6:
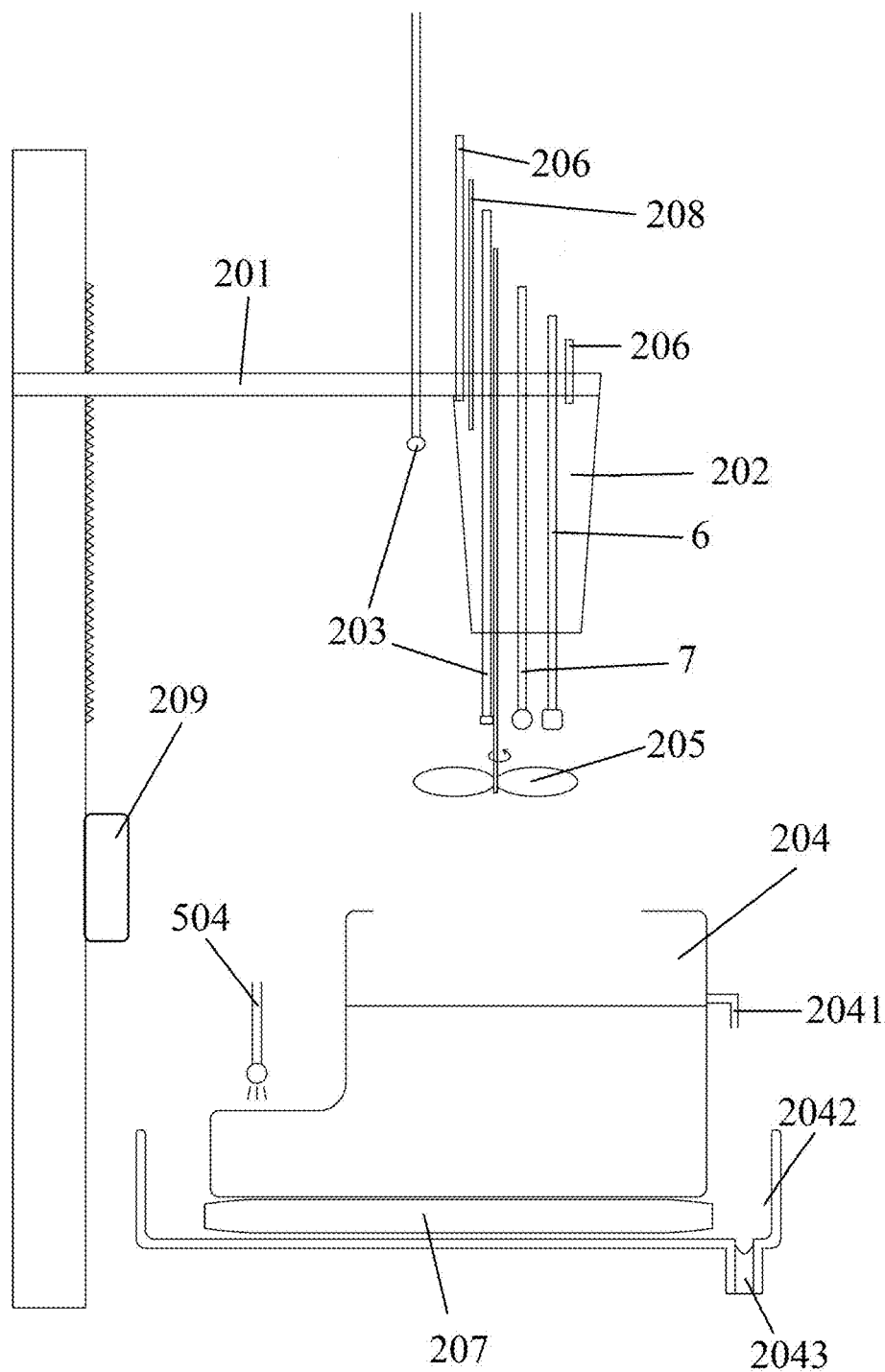
FIG. 6 is a schematic diagram showing a measurement compartment of a spectroscopic-potentiometric-thermometric multi-dimensional titration analysis instrument provided by the present invention.

Referring to FIG. 6, the measurement compartment 2 comprises a manipulator 201, a titration head 202, a titration control device 203, a reaction container 204, a stirring device 205, a cleaning device 206, a second temperature control device 207, a gas protection device 208 and a feedback signal device 209, wherein the titration head 202 is connected with the wall of the measurement compartment by the manipulator 201, the titration control device 203, the stirring device 205, the cleaning device 206 and the gas protection device 208 are connected with the titration head 202 respectively, and the feedback signal device 209 is connected with the manipulator 201, the titration control device 203, the stirring device 205, the cleaning device 206, the second temperature control device 207 and the gas protection device 208 respectively;

moreover, the titration control device 203 is in communication with the reagent control device 102 by the pipeline 8;

the side wall of the reaction container 204 is provided with a solution overflow hole 2041 to guarantee that the reaction solution in the reaction container 204 may not overflow, and the outside of the reaction container 204 is also provided with a waste solution collection fray 2042 to collect solution overflowing from the solution overflow hole 2041, the waste solution collection tray 2042 comprising a waste solution outlet 2043, the overflowing solution being discharged from the measurement compartment 2 through the waste solution outlet 2043.

Figure 7:
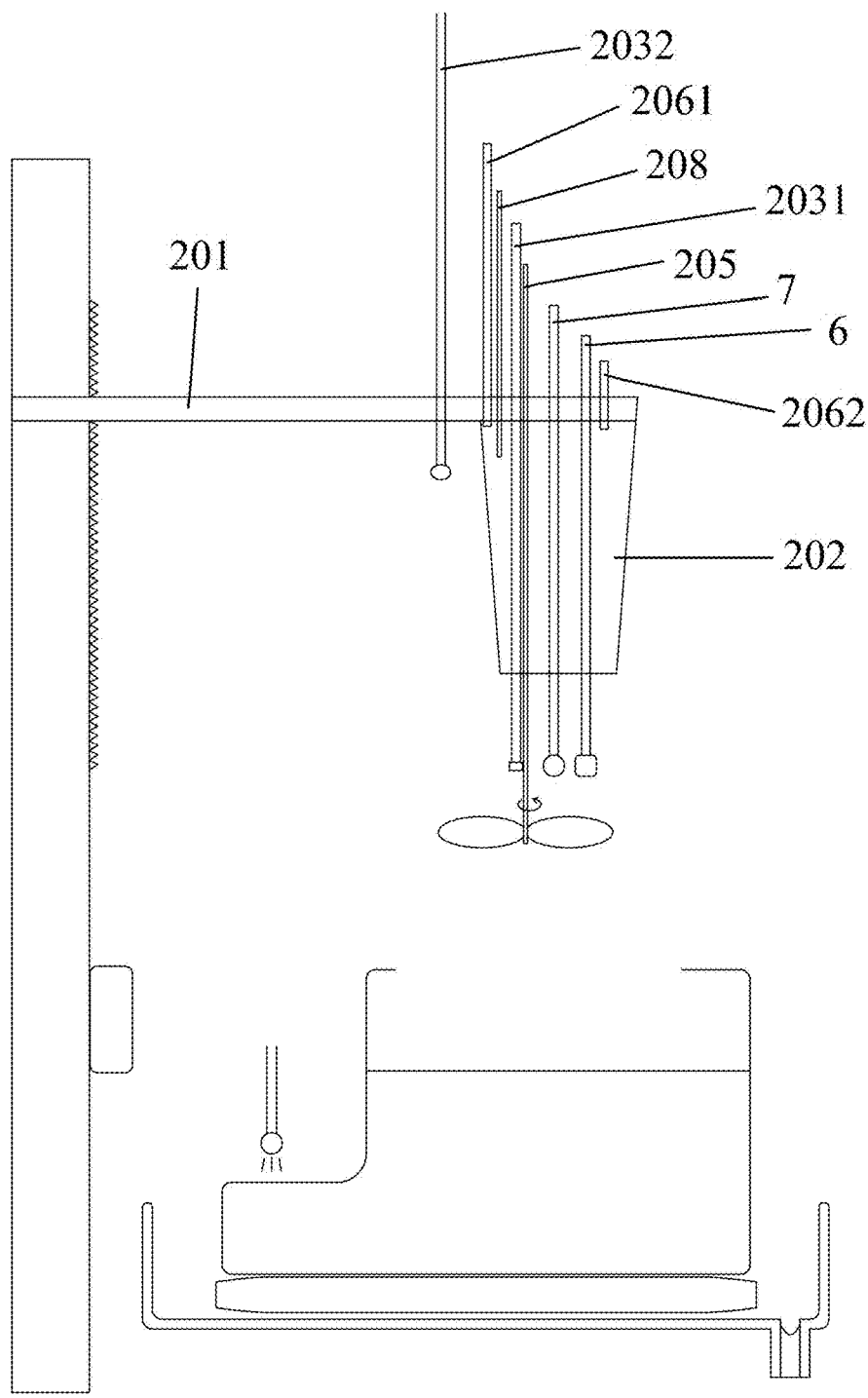
FIG. 7 is a schematic diagram showing a titration head of a measurement compartment of a spectroscopic-potentiometric-thermometric multi-dimensional titration analysis instrument provided by the present invention.

Referring to FIG. 7, the cleaning device 206 comprises a cleaning fluid assembly 2061 and a cleaning gas assembly 2062, wherein the cleaning fluid assembly 2061 flushes the stirring device 205, the optical signal sensor 504, the temperature signal sensor 6 and the potential signal sensor 7 which are immersed in the reaction solution by spraying cleaning fluid, and the cleaning gas assembly 2062 purges the stirring device 205, the optical signal sensor 504, the temperature signal sensor 6 and the potential signal sensor 7 which are immersed in the reaction solution through clean air or inert gas; and the titration control device 203 comprises at least one reagent adding assembly 2031 and a liquid level distance sensor 2032, wherein the speed, type or time of addition of the titration reagent is controlled by the opening or closing of the reagent adding assembly 2031, and the distance between the titration head 202 and the reaction container 204 is controlled by the liquid level distance sensor 2032.

The titration measurement system comprises a spectral titration measurement device 5, a thermometric titration measurement device and a potentiometric titration measurement device, the spectral titration measurement device 5, the thermometric titration measurement device and the potentiometric titration measurement device being arranged in parallel inside the measurement compartment 2, wherein the spectral titration measurement device 5 comprises an optical signal sensor 504, the thermometric titration measurement device comprises a temperature signal sensor 6, and the potentiometric titration measurement device comprises a potential signal sensor 7, wherein the temperature signal sensor 6, the potential signal sensor 7 and the optical signal sensor 504 are connected with the reaction container 204 by signals.

Figure 8:
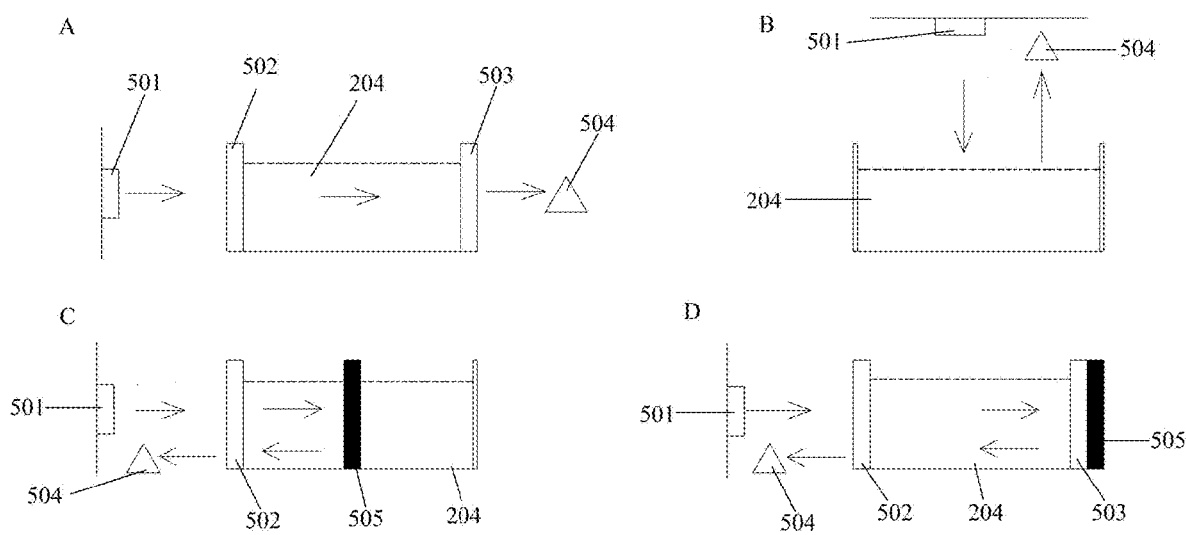
FIG. 8 is a schematic diagram showing an optical path of four measurement modes of a spectral titration mode of a spectroscopic-potentiometric-thermometric multi-dimensional titration analysis instrument provided by the present invention.

Referring to FIG. 8, the spectral titration measurement device 5 further comprises a light source 501 and an optical signal loading component, the light source 501, the optical signal loading component and the optical signal sensor 504 being connected in sequence by optical signals, wherein the optical signal loading component comprises a first optical lens 502, the first optical lens 502 being arranged on the outer wall of the reaction container 204; the optical signal loading component further comprises a second optical lens 503, the second optical lens 503 being arranged on the outer wall of the reaction container 204; and the optical signal loading component further comprises a reflector 505, the reflector 505 being arranged on the outer wall or inside of the reaction container 204.

Referring to FIG. 1, the data processing system comprises a measurement signal conversion and calculation device 3, the measurement signal conversion and calculation device 3 being connected with the spectral titration measurement device 5, the thermometric titration measurement device 6 and the potentiometric titration measurement device 7 respectively by signals.

The spectral-potentiometric-thermometric multi-dimensional titration analysis instrument for chemical reaction further comprises a data output display system 4, the data output display system 4 being connected with the data processing system to synchronously output and display multi-dimensional titration parameters.

In operation, the instrument is started, the remaining amount of reagent in the titration solution storage container 101 and the purifying agent container 10221 is determined, and the opening or closing of the valve 10212 or the valve 10224 is controlled to adjust the gas path and the airflow velocity, and air is introduced into the gas filtration assembly 1022 to remove carbon dioxide, oxygen or water from the air, or inert gas is introduced to provide a protective gas environment for the titration reagent. Meanwhile, the first temperature control device 103 is started to store the titration reagent at a constant temperature.

When titration is prepared, the titrate is added into the reaction container 204, and the manipulator 201 is adjusted to make the titration head 202 and the reaction container 204 reach appropriate relative positions. The second temperature control device 207 and the gas protection device 208 are started, the environment parameters of the measurement compartment 2 are adjusted, and the speed, type or time of addition of the titration reagent is controlled by the reagent adding assembly 2031.

At the beginning of titration, the titration head 202 is downward moved to the bottleneck of the reaction container 204 and is closed, the titration reagent is dropwise added from the titration solution storage container 101 into the reaction container 204 by the reagent adding assembly 2031 through the pipeline 8, the stirring device 205 is started, and measurement is made using one or more of the optical signal sensor 504, the temperature signal sensor 6 and the potential signal sensor 7.

When spectral titration measurement is made, the spectral titration measurement device 5 measures the titration reaction in the reaction container 204, wherein the total transmission mode (as shown in FIG. 8A) is that optical signals are emitted from the light source 501 and enter the reaction container 204 via the first optical lens 502, after some wavelength light of the optical signals are absorbed in the reaction solution, the optical signals loaded with absorption signals are emitted via the second optical lens 503, and the spectral information is introduced into the measurement signal conversion and calculation device 3 by the optical signal sensor 504, to obtain spectral measurement information of the titration reaction;

the reflection mode (as shown in FIG. 8B) is that optical signals are emitted from the light source 501 and directly enter the reaction container 204, after some wavelength light of the optical signals are absorbed by the surface of the reaction solution, the optical signals loaded with absorption signals are reflected by the surface of the solution, and the spectral information is introduced into the measurement signal conversion and calculation device 3 by the optical signal sensor 504, to obtain spectral measurement information of the titration reaction;

the semi transmission-semi reflection mode (as shown in FIG. 8C) is that optical signals are emitted from the light source 501 and enter the reaction container 204 via the first optical lens 502, after some wavelength light of the optical signal are absorbed in the reaction solution, the optical signals loaded with absorption signals are emitted by the reflector 505 inside the solution and emitted out of the reaction container 204 via the first optical lens 502, and the spectral information is introduced into the measurement signal conversion and calculation device 3 by the optical signal sensor 504, to obtain the spectral measurement information of the reaction solution; and the total transmission-total reflection mode (as shown in FIG. 8D) is that optical signals are emitted from the light source 501 and enter the reaction container 204 via the first optical lens 502, after some wavelength light of the optical signals are absorbed in the reaction solution, the optical signals loaded with absorption signals are emitted via the second optical lens 503, are reflected by the reflector 505 and then enter the reaction solution again, are absorbed and loaded with absorption signals again, and then are reflected out of the reaction container 204 from the first optical lens 502, and the spectral information is introduced into the measurement signal conversion and calculation device 3 by the optical signal sensor 504, to obtain spectral measurement information of the titration reaction.

After titration is completed, the measurement signal conversion and calculation device 3 sends a signal to the feedback signal device 209, the stirring device 205, the second temperature control device 207, the gas protection device 208 and the reagent adding assembly 2031 stop operating, and the manipulator 201 drives the titration head 202 to move, to be away from the reaction container 204 under the signal feedback of the liquid level distance sensor 2032, the cleaning device 206 starts to clean the stirring device 205, the optical signal sensor 504, the temperature signal sensor 6 and the potential signal sensor 7 which are immersed in the reaction solution, and the solution overflow hole 2041 discharges the reaction solution in the reaction container 204 out of the measurement compartment 2 through the waste solution outlet 2043 of the waste solution collection tray 2042, to conduct the next titration reaction.

Embodiment 2

A titration method of the spectral-potentiometric-thermometric multi-dimensional titration analysis instrument, comprising the following steps:

S1. starting the instrument;

S2. setting environment parameters of the reagent compartment, controlling the temperature of the reagent compartment 1 by the first temperature control device 106, and providing a protective gas environment for the titration reagent by the reagent control device, wherein after being filtered by the gas filtration assembly 102, protective gas enters the titration solution storage container 101 through the protective gas assembly 103;

S3. setting environment parameters of the measurement compartment 2, setting a titration parameter of the titration reagent by the titration control device 201, controlling the temperature of the measurement compartment 2 by the second temperature control device 205, and filling protective gas for the reaction container 204 by the gas protection device 202;

S4. preprocessing before measurement: conducting reference calibration on the instrument using a blank standard sample, and after completing calibration, preparing titrate in the reaction container 204 for later use;

S5. setting measurement parameters: setting time t as a measurement parameter in the data processing system, selecting the total transmission mode of the spectral titration mode, and selecting CIE 1976 L*a*b* colorimetric parameter L* value as a measurement parameter;

S6. measuring reaction to be measured: adding the titration reagent in the titration solution storage container 101 into the reaction container 204 by the reagent control device and the titration control device 201, reacting same with the titrate obtained in step S4, and measuring a spectral signal of the reaction solution in the reaction container 204 by the spectral titration measurement device 5, to obtain measurement data corresponding to the time t and measurement parameter L* value set in step S5;

S7. storing and analyzing the measurement data obtained in step S6 by the data processing system, and synchronously displaying the measurement data by the data output display system 4; and S8. after titration is completed, terminating the operation of the titration control device 201, the gas protection device 202, the stirring device 203 and the second temperature control device 205 by the feedback signal device 206, and starting the cleaning device, to clean the reaction container 204 and the stirring device 203.

Embodiment 3

A titration method of the spectral-potentiometric-thermometric multi-dimensional titration analysis instrument, comprising the steps as described in embodiment 2, except that:

S5. setting measurement parameters: setting pulse signal f as a metering parameter in the data processing system, selecting the semi transmission-semi reflection mode of the spectral titration mode, selecting CIE 1976 L*a*b* colorimetric parameter a* value as a measurement parameter, selecting the measurement method of the solution surface irradiation mode of the thermometric titration mode, and selecting the derived parameter $T^2$ of the thermometric titration parameter T as a measurement parameter.

Correspondingly, the rest steps, are the same as those in embodiment 2.

Embodiment 4

A titration method of the spectral-potentiometric-thermometric multi-dimensional titration analysis instrument, comprising the steps as described in embodiment 2, except that:

S5. setting measurement parameters: setting the added titration solution volume V and reaction solution concentration C as metering parameters in the data processing system, selecting the reflective mode of the spectral titration mode, selecting CIE 1976 L*a*b* colorimetric parameter ΔE value as a measurement parameter, selecting the measurement method of the adherence contact mode of the thermometric titration mode, selecting the derived parameter T of the thermometric titration parameter T as a measurement parameter, and meanwhile, selecting the potentiometric titration mode and selecting the derived parameter Es/T of the potentiometric titration parameter Es as a measurement parameter.

Correspondingly, the rest steps are the same as those in embodiment 2.

In order to further verify the excellent effects of the present invention, the inventors also performed the following experiments.

Experiment Example 1

Weighing 110 g of sodium hydroxide, dissolving same in carbon dioxide-free water, shaking uniformly, injecting into a polyethylene container, and hermetically placing until the solution is clear, the solution being used to prepare a stock solution of the sodium hydroxide solution; taking 5.4 mL of supernatant of the stock solution with a plastic pipe, diluting to 1000 mL with carbon dioxide-free water, and shaking uniformly, the solution being a sodium hydroxide standard solution with unknown concentration c; placing the solution in the titration solution storage container 101 of the spectral-potentiometric-thermometric multi-dimensional titration analysis instrument of embodiment 1, filling protective gas, starting the first temperature control device 103 and reading a temperature parameter;

drying working chemical-potassium acid phthalate (molar mass: g/mol) [M(KHC$_8$H$_4$O$_4$)=204.22] in an electric oven of 105° C.-110° C. to constant weight, weighing 0.7526 g of (m) potassium acid phthalate on a scale with an accuracy greater than 0.1 mg, and dissolving same to be potassium acid phthalate solution with 80 mL of carbon dioxide-free water; and transferring the solution into the reaction container 204, the solution being a sample solution to be measured.

Weighing 1 g of phenolphthalein indicator, and dissolving, diluting and fixing the volume to 100 mL with ethanol (95%).

Turning off the second temperature control device 207, starting the gas protection device 208, and filling the reaction container 204 with water as a blank sample for measurement; cleaning and titrating components immersed in the solution for later use.

Setting general parameters: setting the measurement period to 0.2 s, the minimum volume of reagent added to 10 μL, the maximum volume of reagent dropwise added to 100 μL, and the stirring speed to 200 rpm.

Setting measurement parameters: starting the tungsten light source and stabilizing until the luminous flux is stable, selecting the total transmission measurement mode, wherein the spectral range is 380 nm-780 nm, the interval is 5 nm, the integration time is ≤2, the slit width is ≤5.0, adjusting the blank value of the device with water, and measurement data to collect spectral transmittance; selecting the acid-base titration mode, pH electrode, and measurement data to collect the potentiometric titration parameter Es; and selecting the contact immersion mode, temperature electrode, and measurement data to collect the thermometric titration parameter T.

Adding two drops of phenolphthalein indicator into the same amount of water as the sample solution to be measured, titrating by taking the solution as sample blank, and titrating same with the sodium hydroxide standard solution with unknown concentration, until the volume of the sodium hydroxide standard solution with unknown concentration consumed at the titration end-point reaches the blank test volume $V_{blank}$; and adding two drops of phenolphthalein indicator into the sample solution to be measured, to obtain titrate, and titrating same with the sodium hydroxide standard solution with unknown concentration, until the volume of the sodium hydroxide standard solution with unknown concentration c consumed at the titration end-point reaches the test volume V of the sample to be measured.

The reagent temperature during measurement is 25° C., the reagent volume $V_{blank}$ consumed by experiment blank is 0.05 ml, and titration data are as shown in Table 1.

TABLE 1

| Titration volume V (ml) | Derived parameter of potentiometric titration Es | Derived parameter of spectral titration S | Derived parameter of thermometric titration T |
| --- | --- | --- | --- |
| 30.00 | 1656 | 53331 | 23333 |
| 30.05 | 3321 | 265111 | 3561 |
| 30.10 | 261 | 196616 | 24 |
| 30.15 | 216 | 19492055 | 54981 |
| 30.20 | 8 | 1250317 | 219962 |
| 30.25 | 8 | 2486836 | 71350 |
| 30.30 | 85184 | 447473 | 6789 |
| 30.35 | 262144 | 5435 | 676 |
| 30.40 | 238328 | 152588 | 1167 |
| 30.45 | 125000 | 71227 | 60 |
| 30.50 | 216000 | 9664611 | 1168 |
| 30.55 | 262144 | 1830114 | 25152 |
| 30.60 | 85184 | 232811 | 848556 |
| 30.65 | 13824 | 7511488 | 39450 |
| 30.70 | 32768 | 908502 | 71730 |
| 30.75 | 21952 | 38219 | 39071 |
| 30.80 | 10648 | 1976849 | 26417 |
| 30.85 | 39304 | 6283357 | 6481 |

TABLE 1-continued

| Titration volume V (ml) | Derived parameter of potentiometric titration Es | Derived parameter of spectral titration S | Derived parameter of thermometric titration T |
|---|---|---|---|
| 30.90 | 64000 | 2309003 | 99399 |
| 30.95 | 39304 | 1113247 | 400146 |
| 31.00 | 46656 | 5657719 | 583629 |
| 31.05 | 39304 | 8194622 | 6066035 |
| 31.10 | 46656 | 396553 | 996158 |
| 31.15 | 46656 | 546615 | 257015 |
| 31.20 | 54872 | 1162891 | 4390306 |
| 31.25 | 39304 | 21103 | 1650764 |
| 31.30 | 27000 | 8510 | 266855 |
| 31.35 | 64000 | 23635 | 675000 |
| 31.40 | 64000 | 11026 | 552219 |
| 31.45 | 97336 | 1719 | 5838501 |
| 31.50 | 64000 | 28250 | 1622238 |
| 31.55 | 64000 | 1419 | 467553 |
| 31.60 | 97336 | 6088532 | 4025 |
| 31.65 | 97336 | 333423 | 1870 |
| 31.70 | 97336 | 288423 | 1603 |
| 31.75 | 140608 | 1635406 | 12723 |
| 31.80 | 125000 | 30541 | 12924 |
| 31.85 | 157464 | 516577 | 967 |
| 31.90 | 157464 | 157951 | 4992 |
| 31.95 | 216000 | 196 | 7681 |
| 32.00 | 262144 | 5432316 | 6481 |
| 32.05 | 287496 | 2773443 | 4447 |
| 32.10 | 474552 | 699800 | 1613 |
| 32.15 | 636056 | 2128494 | 1598 |
| 32.20 | 551368 | 543045 | 1566862 |
| 32.25 | 1061208 | 136139 | 80417 |
| 32.30 | 1560896 | 15108662 | 3499486 |
| 32.35 | 2406104 | 12056196 | 1046142 |
| 32.40 | 4096000 | 760990 | 729341 |
| 32.45 | 6229504 | 340391 | 2771372 |
| 32.50 | 8741816 | 3286061 | 1031240 |
| 32.55 | 12167000 | 3086957 | 6996416 |
| 32.60 | 6859000 | 62685 | 24328287 |
| 32.65 | 5832000 | 215087 | 1103567 |
| 32.70 | 2628072 | 6643978 | 14594350 |
| 32.75 | 9528128 | 28969893 | 4223 |
| 32.80 | 1404928 | 105802690 | 12821900 |
| 32.85 | 231475544 | 2074 | 4873361 |
| 32.90 | 46656 | 641286 | 132519744 |
| 32.95 | 216000 | 945123 | 99543826 |
| 33.00 | 592704 | 219 | 49510356 |
| 33.05 | 12487168 | 1191247 | 353 |
| 33.10 | 34645976 | 4693 | 665501 |
| 33.15 | 314432 | 216365 | 2764835 |
| 33.20 | 23887872 | 44135934 | 4339326 |
| 33.25 | 13481272 | 7383242 | 2500057 |

Figure 9:
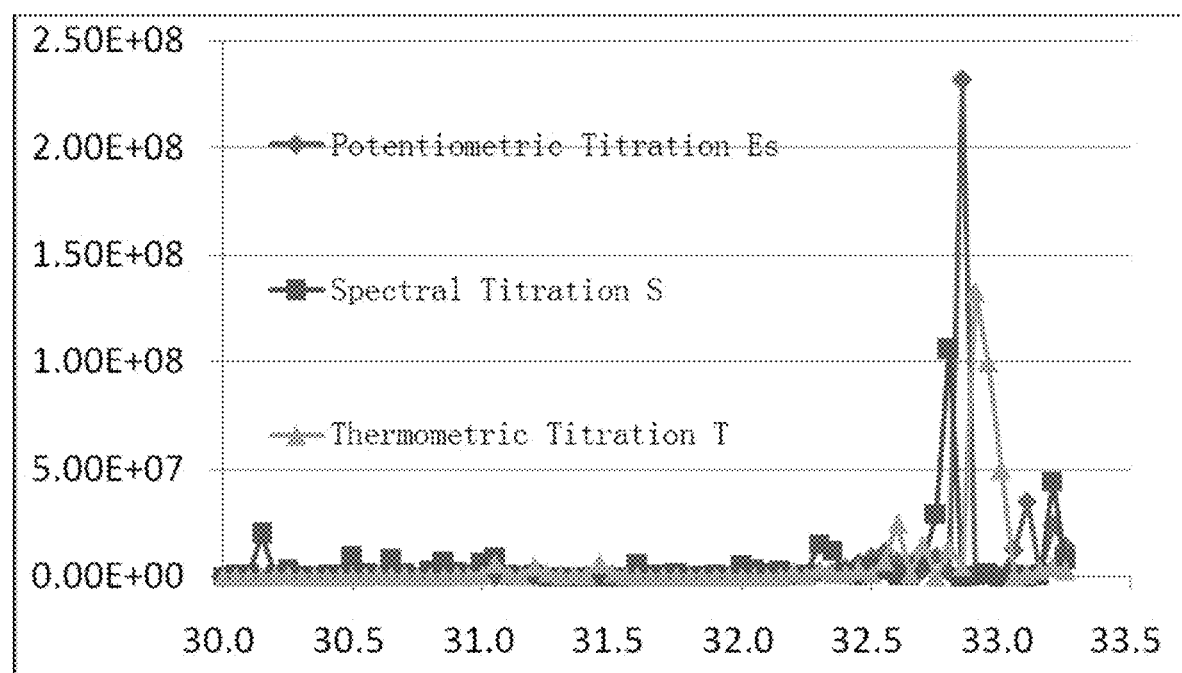
FIG. 9 shows a multi-dimensional titration curve provided in experiment example 1 of the present invention.

The titration curve plotted by taking the titration volume as abscissa and the measurement parameter as ordinate is as shown in FIG. 9. When reaching the titration end-point, the volume of the sodium hydroxide standard solution with unknown concentration corresponding to the peak value of the potentiometric titration end-point is 32.85 ml, the volume of the sodium hydroxide standard solution with unknown concentration corresponding to the peak value of the spectral titration end-point is 32.80 ml, and the volume of the sodium hydroxide standard solution with unknown concentration corresponding to the peak value of the thermometric titration end-point is 32.90 ml. After converting the $V_{blank}$ consumed by experiment blank and the volume consumed by titration into standard volume of 20° C., the concentrations of the sodium hydroxide standard solution of the potentiometric titration method, the spectral titration method and the thermometric titration method are calculated respectively according to the following formula:

$$c = \frac{1000 \times m}{(V - V_{Blank}) \times M}.$$

It is known by calculation that the volume of the sodium hydroxide standard solution with unknown concentration c measured by the potentiometric titration method is $c_{Es}=0.1125$ mol/L; the volume of the sodium hydroxide standard solution with unknown concentration c measured by the spectral titration method is $c_s=0.1127$ mol/L; the volume of the sodium hydroxide standard solution with unknown concentration c measured by the thermometric titration method is $c_T=0.1123$ mol/L; and for titration of a spectral-potentiometric-thermometric multi-dimensional titration analysis instrument, the standard deviation(s) is 0.0002, and the relative standard deviation (RSD %) is 0.18%.

Experiment Example 2

Weighing 110 g of sodium hydroxide, dissolving same in carbon dioxide-free water, shaking uniformly, injecting into a polyethylene container, and hermetically placing until the solution is clear, the solution being used to prepare a stock solution of the sodium hydroxide solution; taking 5.4 mL of supernatant of the stock solution with a plastic pipe, diluting to 1000 mL with carbon dioxide-free water, and shaking uniformly, the solution being a sodium hydroxide standard solution with unknown concentration;

Drying working chemical-potassium acid phthalate in an electric oven of 105° C.-110° C. to constant weight, weighing 0.7555 g, 0.7587 g and 0.7516 g of potassium acid phthalate on a scale with an accuracy greater than 0.1 mg for potentiometric titration, spectral titration and thermometric titration, and respectively dissolving same to be potassium acid phthalate solutions with 80 mL of carbon dioxide-free water.

Weighing 1 g of phenolphthalein indicator, and dissolving, diluting, and fixing the volume to 100 mL with ethanol (95%).

Making titration measurement using the commercial potentiometric titration instrument and thermometric titration instrument and the color measurement instrument for chemical analysis with the patent publication No. of CN 106645134 A; and setting the same titration parameters as those in experiment example 1.

Adding two drops of phenolphthalein indicator into the same amount of water as the sample solution to be measured, titrating by taking the solution as sample blank, and titrating same with the sodium hydroxide standard solution with unknown concentration, until the volume of the sodium hydroxide standard solution with unknown concentration consumed at the titration end-point reaches the blank test volume $V_{blank}$; and adding two drops of phenolphthalein indicator into the sample solution to be measured, to obtain titrate, and titrating same with the sodium hydroxide standard solution with unknown concentration, until the volume of the sodium hydroxide standard solution with unknown concentration consumed at the titration end-point reaches the test volume V of the sample to be measured.

The reagent temperature during measurement is 25° C., the reagent volume $V_{blank}$ consumed by experiment blank is 0.05 ml, and titration data are as shown in Table 2.

TABLE 2

| Titration volume (ml) | Potentiometric titration Es | Spectral titration S | Thermometric titration T |
|---|---|---|---|
| 30.00 | 265 | 365546 | 2 |
| 30.05 | 624 | 35622 | 1 |
| 30.10 | 0 | 22651 | 1 |
| 30.15 | 2 | 324868 | 1375 |
| 30.20 | 0 | 20839 | 5499 |
| 30.25 | 0 | 41447 | 1784 |
| 30.30 | 852 | 7458 | 170 |
| 30.35 | 2621 | 91 | 17 |
| 30.40 | 2383 | 2543 | 29 |
| 30.45 | 1250 | 1187 | 2 |
| 30.50 | 2160 | 161077 | 29 |
| 30.55 | 2621 | 30502 | 629 |
| 30.60 | 852 | 3880 | 21214 |
| 30.65 | 138 | 125191 | 986 |
| 30.70 | 328 | 15142 | 1793 |
| 30.75 | 220 | 637 | 977 |
| 30.80 | 106 | 32947 | 660 |
| 30.85 | 393 | 104723 | 162 |
| 30.90 | 640 | 38483 | 2485 |
| 30.95 | 393 | 18554 | 10004 |
| 31.00 | 467 | 94295 | 14591 |
| 31.05 | 393 | 136577 | 151651 |
| 31.10 | 467 | 6609 | 24904 |
| 31.15 | 467 | 9110 | 6425 |
| 31.20 | 549 | 19382 | 109758 |
| 31.25 | 393 | 352 | 41269 |
| 31.30 | 270 | 142 | 6671 |
| 31.35 | 640 | 394 | 16875 |
| 31.40 | 640 | 184 | 13805 |
| 31.45 | 973 | 29 | 145963 |
| 31.50 | 640 | 471 | 40556 |
| 31.55 | 640 | 24 | 11689 |
| 31.60 | 973 | 101476 | 101 |
| 31.65 | 973 | 5557 | 47 |
| 31.70 | 973 | 4807 | 40 |
| 31.75 | 1406 | 27257 | 318 |
| 31.80 | 1250 | 509 | 323 |
| 31.85 | 1575 | 8610 | 24 |
| 31.90 | 1575 | 2633 | 125 |
| 31.95 | 2160 | 3 | 192 |
| 32.00 | 2621 | 90539 | 162 |
| 32.05 | 2875 | 46224 | 111 |
| 32.10 | 4746 | 11663 | 40 |
| 32.15 | 6361 | 35475 | 40 |
| 32.20 | 5514 | 9051 | 39172 |
| 32.25 | 10612 | 2269 | 2010 |
| 32.30 | 15609 | 251811 | 87487 |
| 32.35 | 24061 | 200937 | 175648 |
| 32.40 | 40960 | 12683 | 69284 |
| 32.45 | 62295 | 5673 | 25781 |
| 32.50 | 87418 | 4001 | 174910 |
| 32.55 | 121670 | 19261 | 608207 |
| 32.60 | 68590 | 3585 | 27589 |
| 32.65 | 13310 | 110733 | 364859 |
| 32.70 | 3430 | 482832 | 106 |
| 32.75 | 26281 | 1763378 | 3312994 |
| 32.80 | 95281 | 35 | 1643545 |
| 32.85 | 14049 | 10688 | 1488596 |
| 32.90 | 155165 | 15752 | 1237759 |
| 32.95 | 2314755 | 4 | 9 |
| 33.00 | 2160 | 19854 | 16638 |
| 33.05 | 5927 | 78 | 69121 |
| 33.10 | 124872 | 3606 | 108483 |
| 33.15 | 346460 | 735599 | 62501 |
| 33.20 | 3144 | 123054 | 61661 |
| 33.25 | 238879 | 165656 | 52616 |

Figure 10:
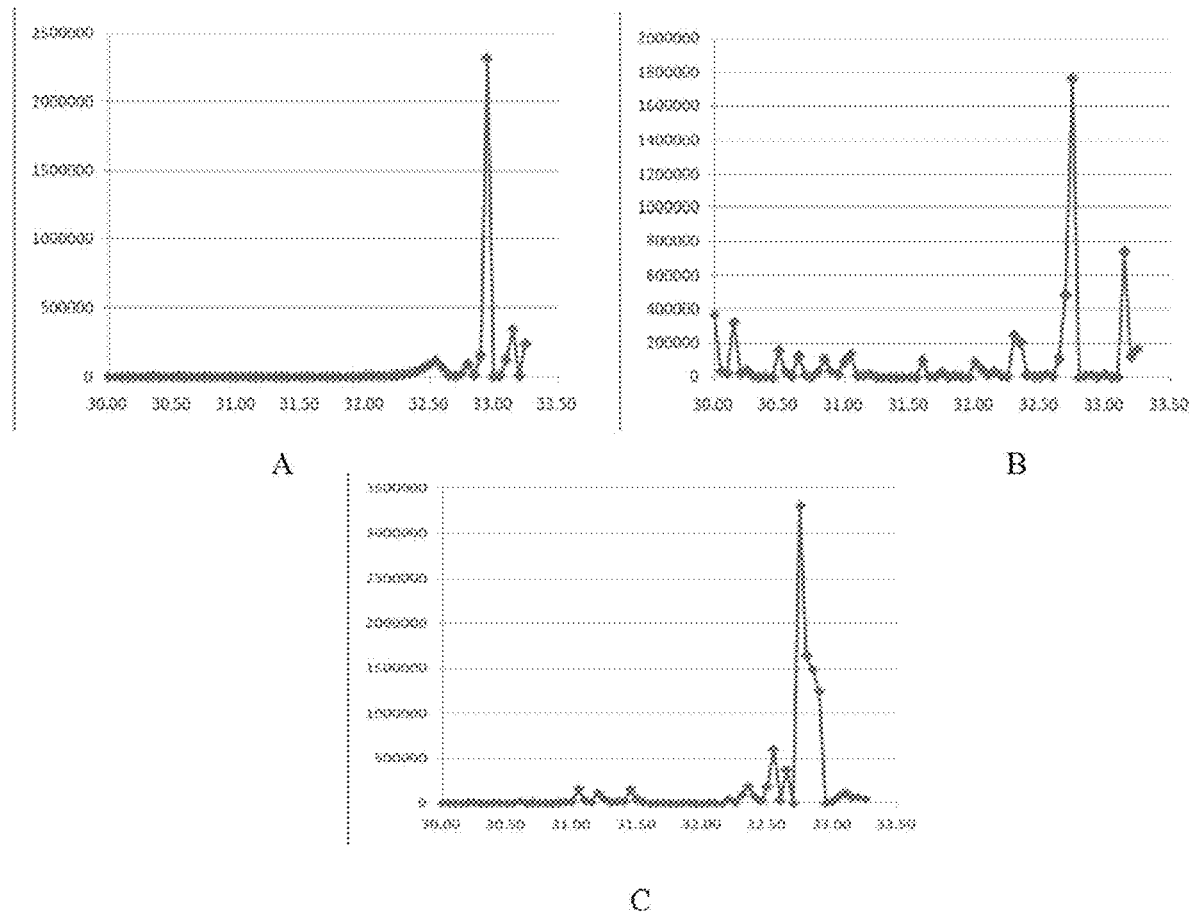
FIG. 10 shows a potentiometric (A), spectroscopic (B) and thermometric (C) titration curve provided in experiment example 2 of the present invention.

The titration curve plotted by taking the titration volume as abscissa and the measurement parameter as ordinate is as shown in FIG. 10, where A represents potentiometric titration curve, B represents spectral titration curve and C represents thermometric titration curve. It can be seen that when reaching the titration end-point, the volume of the sodium hydroxide standard solution with unknown concentration corresponding to the peak value of the potentiometric titration end-point is 32.95 ml, the volume of the sodium hydroxide standard solution with unknown concentration corresponding to the peak value of the spectral titration end-point is 32.75 ml, and the volume of the sodium hydroxide standard solution with unknown concentration corresponding to the peak value of the thermometric titration end-point is 32.75 ml. After converting the $V_{blank}$ consumed by experiment blank and the volume consumed by titration into standard volume of 20° C., the concentrations of the sodium hydroxide standard solution of the potentiometric titration method, the spectral titration method and the thermometric titration method are calculated respectively according to the following formula:

$$c = \frac{1000 \times m}{(V - V_{Blank}) \times M}.$$

It is known by calculation that the volume of the sodium hydroxide standard solution with unknown concentration c measured by the potentiometric titration method is cEs=0.1126 mol/L; the volume of the sodium hydroxide standard solution with unknown concentration c measured by the spectral titration method is cs=0.1137 mol/L; the volume of the sodium hydroxide standard solution with unknown concentration c measured by the thermometric titration method is cT=0.1127 mol/L; and for sodium hydroxide standard solution with the same unknown concentration, the standard deviation(s) of the three titration methods is 0.0006, and the relative standard deviation (RSD %) is 0.54%.

It can be known from the data of experiment examples 1 and 2 that in the present invention, the single titration measurement instrument is changed into a multi-dimensional titration instrument comprising a spectral titration measurement device, a potentiometric titration measurement device and a thermometric titration measurement device which are arranged in parallel, on the basis of not changing the existing operating procedures, errors between the measurement parameters of different measurement modes due to different measurement conditions in the titration measurement process and unknown chemical reaction process can be corrected in real time by unifying the measurement parameters of the metering points, the standard deviation(s) of the three titration methods between 'separate titrations' and 'the multi-dimensional titration' is reduced to 0.0002 from 0.0006, the relative standard deviation (RSD %) is reduced to 0.18% from 0.54%, having significant statistical difference, being beneficial to reducing the errors between different titration measurement modes, and improving the measurement precision. Moreover, by means of the present invention, simultaneous measurement of the same samples using multiple titration modes may be achieved, improving analysis speed, reducing analysis steps, and greatly reducing the workload of analysts.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

The invention claimed is:

1. A spectral-potentiometric-thermometric multi-dimensional titration analysis instrument, comprising a reagent control system, a titration measurement system and a data processing system, the reagent control system being connected with the data processing system by the titration measurement system, wherein the reagent control system comprises a reagent compartment and a measurement compartment, the reagent compartment being in communication with the measurement compartment by a reagent pipeline;

the titration measurement system comprises a spectral titration measurement device, a thermometric titration measurement device and a potentiometric titration measurement device, the spectral titration measurement device, the thermometric titration measurement device and the potentiometric titration measurement device being arranged in parallel inside the measurement compartment;

the data processing system comprises a measurement signal conversion and calculation device, the measurement signal conversion and calculation device being connected with the spectral titration measurement device, the thermometric titration measurement device and the potentiometric titration measurement device respectively by signals;

wherein the spectral titration measurement device, the potentiometric titration measurement device and the thermometric titration measurement device are configured to simultaneously measure measurement parameters, and to obtain spectral titration parameters, potentiometric titration parameters and thermometric titration measurement parameters under the same chemical, reaction condition.

2. The spectral-potentiometric-thermometric multi-dimensional titration analysis instrument according to claim 1, wherein the reagent compartment comprises a titration solution storage container, a reagent control device and a first temperature control device, wherein the titration solution storage container is in communication with the reagent control device by a reagent pipeline, and the first temperature control device is connected with the titration solution storage container and the reagent control device respectively;

the reagent control device comprises a protective gas assembly, a gas filtration assembly and a liquid sensing assembly, wherein the protective gas assembly is configured to provide a protective gas environment for a titration reagent in the titration solution storage container, the gas filtration assembly is configured to filter air gas, and the liquid sensing assembly is configured to sense the remaining amount of the titration solution in the titration solution storage container; and the first temperature control device comprises a heating assembly, a cooling assembly and a temperature sensing assembly, and the first temperature control device provides a constant-temperature environment for the titration reagent.

3. The spectral-potentiometric-thermometric multi-dimensional titration analysis instrument according to claim 2, wherein the measurement compartment comprises a manipulator, a titration head, a titration control device, a reaction container, a stirring device, a cleaning device, a second temperature control device, a gas protection device and a feedback signal device, wherein the titration head is connected with the measurement compartment wall by the manipulator, to achieve the relative displacement of the titration head and the reaction container;

the titration control device, the stirring device, the cleaning device and the gas protection device are connected with the titration head respectively, and achieve relative displacement to the reaction container through the titration head;

the feedback signal device is connected with the manipulator, the titration control device, the stirring device, the cleaning device, the second temperature control device and the gas protection device respectively by signals, the second temperature control device is configured to control the container temperature of titration reaction, and the gas protection device is configured to provide a protective gas environment for titration reaction; and the titration control device is in communication with the reagent control device by a pipeline, and the feedback signal device is connected with the measurement signal conversion and calculation device by signals.

4. The spectral-potentiometric-thermometric multi-dimensional titration analysis instrument according to claim 3, wherein the thermometric titration measurement device comprises a temperature signal sensor, the potentiometric titration measurement device comprises a potential signal sensor, and the spectral titration measurement device comprises an optical signal sensor, wherein the temperature signal sensor, the potential signal sensor and the optical signal sensor are connected with the reaction container by signals;

the temperature signal sensor and the potential signal sensor are connected with the titration head, and achieve relative displacement to the reaction container through the titration head; and the spectral titration measurement device further comprises a light source and an optical signal loading component, the light source, the optical signal loading component and the optical signal sensor being connected in sequence by optical signals.

5. The spectral-potentiometric-thermometric multi-dimensional titration analysis instrument according to claim 4, wherein the optical signal loading component comprises an optical lens, the optical lens being arranged on the outer wall of the reaction container.

6. The spectral-potentiometric-thermometric multi-dimensional titration analysis instrument according to claim 5, wherein the optical signal loading component further comprises a reflector, the reflector being arranged on the outer wall or inside of the reaction container.

7. The spectral-potentiometric-thermometric multi-dimensional titration analysis instrument according to claim 1, wherein the spectral-potentiometric-thermometric multi-dimensional titration analysis instrument for chemical reaction further comprises a data output display system, the data output display system being connected with the data processing system to synchronously output and display multi-dimensional titration parameters.

8. A usage method of the spectral-potentiometric-thermometric multi-dimensional titration analysis instrument of claim 1, comprising the following steps:

S1. starting the instrument;

S2. setting environment parameters of the reagent compartment, controlling the temperature of the reagent compartment by the first temperature control device, filtering the air gas by the gas filtration assembly of the reagent control device, and providing a protective gas environment for the titration reagent by the protective gas assembly of the reagent control device;

S3. setting environment parameters of the measurement compartment, setting a titration parameter of the titration reagent by the titration control device, controlling the temperature of the measurement compartment by the second temperature control device, and filling protective gas for the reaction container by the gas protection device;

S4. preprocessing before measurement: conducting reference calibration on the instrument, and preparing titrate in the reaction container for later use;

S5. setting measurement parameters: setting at least one metering parameter in the data processing system, selecting one or more of a spectral titration mode, a thermometric titration mode and a potentiometric titration mode, and selecting at least one measurement parameter of the titration modes;

S6. measuring reaction to be measured: adding the titration reagent in the titration solution storage container into the reaction container by the reagent control device and the titration control device, reacting with the titrate obtained in step S4, and synchronously measuring the reaction solution in the reaction container by one or more of the spectral titration measurement device, the thermometric titration measurement device and the potentiometric titration measurement device, to obtain measurement data corresponding to the metering parameter set tin step S5 and the measurement parameter;

S7. storing and analyzing the measurement data obtained in step S6 by the data processing system, and synchronously displaying the measurement data by the data output display system; and S8. after titration is completed, terminating the operation of the titration control device, the gas protection device, the stirring device and the second temperature control device by the feedback signal device, and starting the cleaning device to clean the stirring device, the optical signal sensor, the temperature signal sensor and the potential signal sensor which are immersed in the reaction solution.

9. The usage method of the spectral-potentiometric-thermometric multi-dimensional titration analysis instrument according to claim 8, wherein the measurement mode of the spectral titration mode described in step S5 includes a total transmission mode, a total transmission-total reflection mode, a semi-transmission-semi reflection mode, or a reflective mode.

10. The usage method of the spectral-potentiometric-thermometric multi-dimensional titration analysis instrument according to claim 8, wherein the measurement mode of the thermometric titration mode described in step S5 includes an immersion contact mode, an adherence contact mode, and a solution surface irradiation mode or container surface irradiation mode.

* * * * *